United States Patent
Bertou et al.

(10) Patent No.: US 12,477,637 B2
(45) Date of Patent: Nov. 18, 2025

(54) ADJUSTING LIGHT EFFECTS BASED ON ADJUSTMENTS MADE BY USERS OF OTHER SYSTEMS

(71) Applicant: SIGNIFY HOLDING B.V., Eindhoven (NL)

(72) Inventors: Etienne Marie Bertou, Veldhoven (NL); Jean Petrus Anna Herfs, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/269,777

(22) PCT Filed: Dec. 14, 2021

(86) PCT No.: PCT/EP2021/085639
§ 371 (c)(1),
(2) Date: Jun. 27, 2023

(87) PCT Pub. No.: WO2022/144171
PCT Pub. Date: Jul. 7, 2022

(65) Prior Publication Data
US 2024/0057234 A1     Feb. 15, 2024

(30) Foreign Application Priority Data
Jan. 4, 2021   (EP) .................................... 21150026

(51) Int. Cl.
*H05B 47/12*     (2020.01)
*H04N 21/43*     (2011.01)
*H04N 21/439*    (2011.01)

(52) U.S. Cl.
CPC ......... *H05B 47/12* (2020.01); *H04N 21/4307* (2013.01); *H04N 21/4394* (2013.01)

(58) Field of Classification Search
CPC . H04N 21/4307; H04N 21/4394; H05B 47/12
See application file for complete search history.

(56) References Cited

U.S. PATENT DOCUMENTS

| 7,369,903 B2 | 5/2008 | Diederiks et al. |
| 2006/0062424 A1* | 3/2006 | Diederiks ........ H04N 21/44008 348/E5.12 |

(Continued)

FOREIGN PATENT DOCUMENTS

| WO | 2004006570 A1 | 1/2004 |
| WO | 2007144823 A1 | 12/2007 |

(Continued)

OTHER PUBLICATIONS

Anonymous, "Philips Ambilight Tvs Go Interactive For 2018 World Cup," Jun. 27, 2018, XP055808610, Retrieved From the Internet: URL:https://essentialinstall.com/news/home-cinema/philips-ambilight-tvs-go-interactive-for-2018-world-cup, Retrived on May 28, 2021(7 Pages).

*Primary Examiner* — Randy A Flynn (57) ABSTRACT

A system (1) for controlling a lighting device (11-12) to render adjusted light effects in relation to audio and/or video content while a media rendering device (23) renders this content is configured to receive one or more input signals, determine light effects based on the input signals, identify one or more settings which have not been adjusted by a user of the system in relation to the audio and/or video content, and determine one or more values for the settings based on the input signals. The values are based on adjustments made by one or more users of one or more other systems (48,49) to the settings in relation to the audio and/or video content. The system is further configured to adjust the light effects based on the values and control the lighting device to render the adjusted light effects.

14 Claims, 4 Drawing Sheets

(56) References Cited

U.S. PATENT DOCUMENTS

| | | | |
|---|---|---|---|
| 2015/0195100 A1* | 7/2015 | Imes | G05B 15/02 |
| | | | 455/420 |
| 2016/0232244 A1* | 8/2016 | Liu | G06Q 30/0269 |
| 2017/0367164 A1 | 12/2017 | Engelen et al. | |
| 2019/0069375 A1 | 2/2019 | Baker et al. | |
| 2019/0159325 A1 | 5/2019 | Kumar et al. | |

FOREIGN PATENT DOCUMENTS

| | | |
|---|---|---|
| WO | 2010079388 A1 | 7/2010 |
| WO | 2020144196 A1 | 7/2020 |

* cited by examiner

ADJUSTING LIGHT EFFECTS BASED ON ADJUSTMENTS MADE BY USERS OF OTHER SYSTEMS

CROSS-REFERENCE TO PRIOR APPLICATIONS

This application is the U.S. National Phase application under 35 U.S.C. § 371 of International Application No. PCT/EP2021/085639, filed on Dec. 14, 2021, which claims the benefit of European Patent Application No. 21150026.9, filed on Jan. 4, 2021. These applications are hereby incorporated by reference herein.

FIELD OF THE INVENTION

The invention relates to a system for controlling a lighting device to render adjusted light effects in relation to audio and/or video content while a media rendering device renders said audio and/or video content.

The invention further relates to a method of controlling a lighting device to render adjusted light effects in relation to audio and/or video content while a media rendering device renders said audio and/or video content.

The invention also relates to a computer program product enabling a computer system to perform such a method.

BACKGROUND OF THE INVENTION

Entertainment light effects have been used for live events like theme park shows and music artist live performances for quite a while. These light effects are mostly based on scripts, sound input and human control. These solutions are mostly targeted to the audience that is present at the same location.

The creation of entertainment light effects to accompany audio and/or video content being rendered on a media rendering device at home has become quite popular in more recent years. These entertainment light effects may be automatically determined in real-time or may be determined in advance, usually in the form of a light script that is manually and/or automatically created.

As an example of the former, with systems like the Hue Play HDMI Sync Box or the Hue Sync desktop application, it is possible to synchronize lights with whatever is displayed on the screen and the audio that goes along with it. As example of the latter, US 2019/0069375 A1 discloses that lighting information, e.g. a lighting track, may be scripted as part of multimedia content creation and/or created or adapted by crowd sourcing or machine learning of customer preferences.

Entertainment light effects that are determined in advance usually provide a better lighting experience than entertainment light effects that are automatically determined in real-time, because they are usually created or adapted by one or more users. However, with live broadcasts, it is not possible to determine the entertainment light effects in advance. In that case, the user might still be able to improve the lighting experience by changing the values of certain settings that are used for creating the lighting experience for the live broadcast. Overriding lighting experience settings might even improve the overall lighting experience. On the other hand, not every user might be willing to make the effort of changing the values of settings for each live broadcast.

SUMMARY OF THE INVENTION

It is a first object of the invention to provide a system, which is able to provide a good lighting experience for live broadcasts at a remote location with limited user input.

It is a second object of the invention to provide a method, which can be used to provide a good lighting experience for live broadcasts at a remote location with limited user input.

In a first aspect of the invention, a system for controlling a lighting device to render adjusted light effects in relation to audio and/or video content while a media rendering device renders said audio and/or video content comprises at least one input interface, at least one output interface, at least one processor configured to receive one or more input signals via said at least one input interface, determine light effects based on said one or more input signals, identify one or more settings which have not been adjusted by a user of said system in relation to said audio and/or video content, determine one or more values for said one or more settings based on said one or more input signals, said one or more values being based on adjustments made by one or more users of one or more other systems to said one or more settings in relation to said audio and/or video content, adjust said light effects based on said one or more values determined for said one or more settings, and control, via said at least one output interface, said lighting device to render said adjusted light effects.

By letting the system determine values of certain settings that are used for creating a lighting experience for a live broadcast based on adjustments made by one or more other users of one or more other (similar) systems who are watching the same live broadcast, the user of the system does not have to make these adjustments himself. For example, default setting values may be applied until it is possible to use setting values that users that have similar properties or systems have adjusted in relation to the same audio and/or video content, and users may further be able to individually customize light effect settings. If setting values adjusted by others cannot be determined (yet) for a live broadcast, e.g. because it has just started, setting values previously adjusted by others for similar live broadcasts may be used.

The system and the one or more other systems are remote from each other. Said one or more settings may define a color palette, a minimum light intensity, a maximum light intensity, a level of dynamicity, a preferred person and/or team, and/or a delay value, for example. As a first example, a color palette chosen by other users in the same region may be used for adjusting the light effects and this color palette may reflect local team colors. As a second example, a preferred team chosen by other users in the same region may be used to determine whether to add special light effects like fireworks when the preferred team scored a goal in a sports match and/or whether to remove special light effects when another team than the preferred team scored a goal in the sports match.

Said one or more input signals may comprise an identifier of an event captured by said audio and/or video content and said at least one processor may be configured to adjust a subset of said light effects based on at least one of said one or more values in response to receiving said identifier, said at least one value being associated with said identifier. Said event may be one of applause, cheering, an audience being completely silent, an announcement, or a change in game score, for example. This makes it possible to render special light effects customized for a certain live broadcast. For example, the lighting device may be controlled to flash when there is change in game score and the color of the flash may depend on the teams involved in the game.

Said one or more input signals may comprise said audio and/or video content and said at least one processor may be configured to perform audio and/or video analysis on said audio and/or video content to determine said light effects. As a result, the user does not need to rely on a service provider or content provider making a stream with light effects available. The analysis may be performed by an HDMI module like the Hue Play Sync box, for example.

Said at least one processor may be configured to output, via said at least one output interface, an audio and/or video signal comprising said audio and/or video content to a media rendering device, control said lighting device by outputting light commands specifying said adjusted light effects, determine a delay value based on at least one of said one or more values, and delay said outputting of said audio and/or video signal compared to said outputting of said light commands or said outputting of said light commands compared to said outputting of said audio and/or video signal with said delay value.

It is not uncommon for there to be a delay between the rendering of the audio and/or video content and the rendering of the corresponding light effect(s). If the system both controls the lighting device(s) and outputs the audio and/or video content at the same time and there is still a delay, this is usually due different data latencies from system to rendering devices and/or due to the media rendering device needing more or less time to render the audio and/or video content than the time needed by the lighting device(s) to render the light effects. The data latency of the audio and/or video content may depend on the size of the audio and/or video content, i.e. the content stream bitrate. By using a delay value set by another user with a similar home setup (e.g. light setup and/or audio/video setup), the user does not have to find out the best delay value for compensating the delay himself.

Said one or more one input signals may specify said light effects. This is beneficial if the user does not have a device able to perform audio and/or video analysis on the audio and/or video content to determine the light effects.

Said at least one processor may be configured to control said lighting device by outputting light commands specifying said adjusted light effects, determine a delay value based on at least one of said one or more values, and delay said outputting of said light commands with said delay value.

As mentioned above, it is not uncommon for there to be a delay between the rendering of the audio and/or video content and the rendering of the corresponding light effect(s). If the system controls the lighting device(s), but does not output the audio and/or video content, another potential cause for this delay is that the stream of light effects reaches the home network faster or slower than the content stream. This may be due to different latencies between the servers hosting the different streams and the home network. By using a delay value set by another user with a similar home setup and/or in a similar region and/or with a similar network operator, the user does not have to find out the best delay value for compensating the delay himself.

Said at least one processor may be configured to determine said delay value further based on a user-specified default delay value. For example, if the user has a very atypical home setup, he may be able to specify a default delay value compared to a more common home setup.

Said at least one processor may be configured to allow said user of said system to specify one or more own values for said one or more settings and adjust said light effects based on said one or more own values specified for said one or more settings. The user may do this, for example, if he is not satisfied with the adjustments made by the other users. The user's own values may be shared with other users of other systems who are watching and/or listening to the same live broadcast. Thereby, the user's updated settings may be used to improve the experience for others (especially with similar profiles).

Said at least one processor may be configured to transmit data to a further system via said at least one output interface, said data comprising an identification of a user group or user information which allows said further system to identify a user group, said user group comprising users with similar characteristics, and determine said one or more values for said one or more settings by extracting, from at least one of said one or more input signals, one or more values which are based on adjustments made by said users in said user group, said adjustments being made to said one or more settings in relation to said audio and/or video content, said at least one input signal being received from said further system. Said user information may comprise age, geographical location, light setup, audio/video setup, and/or expected network delay, for example.

The expected network delay may be measured using ping commands, for example. The light setup may describe the number of lighting devices, the number of hops between devices in the lighting network, the types of lighting devices, the firmware version(s) of the lighting devices, and/or the reachability of the lighting devices, for example. The light setup, the expected network delay, and/or the geographical region may be used to determine a group of users that would experience a similar delay between the rendering of the audio and/or video content and the rendering of the corresponding light effect(s) if delay compensation would be turned off. Determining a group of users with a similar age may be beneficial for determining an appropriate level of dynamicity, for example. Determining a group of users with a similar geographical region may be beneficial for determining which color(s) to use for special light effects in relation to certain events of a sports match. Determining a group of users with similar networking characteristics (e.g. number of nodes on the network, average and deviation in network latency) may be beneficial for determining which light effects can be executed to create the best lighting experience.

In a second aspect of the invention, a method of controlling a lighting device to render adjusted light effects in relation to audio and/or video content while a media rendering device renders said audio and/or video content comprises receiving one or more input signals, determining light effects based on said one or more input signals, identifying one or more settings which have not been adjusted by a user of said system in relation to said audio and/or video content, determining one or more values for said one or more settings based on said one or more input signals, said one or more values being based on adjustments made by one or more users of one or more other systems to said one or more settings in relation to said audio and/or video content, adjusting said light effects based on said one or more values determined for said one or more settings, and controlling said lighting device to render said adjusted light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a lighting device to render adjusted light effects in relation to audio and/or video content while a media rendering device renders said audio and/or video content.

The executable operations comprise receiving one or more input signals, determining light effects based on said one or more input signals, identifying one or more settings which have not been adjusted by a user of said system in relation to said audio and/or video content, determining one or more values for said one or more settings based on said one or more input signals, said one or more values being based on adjustments made by one or more users of one or more other systems to said one or more settings in relation to said audio and/or video content, adjusting said light effects based on said one or more values determined for said one or more settings, and controlling said lighting device to render said adjusted light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
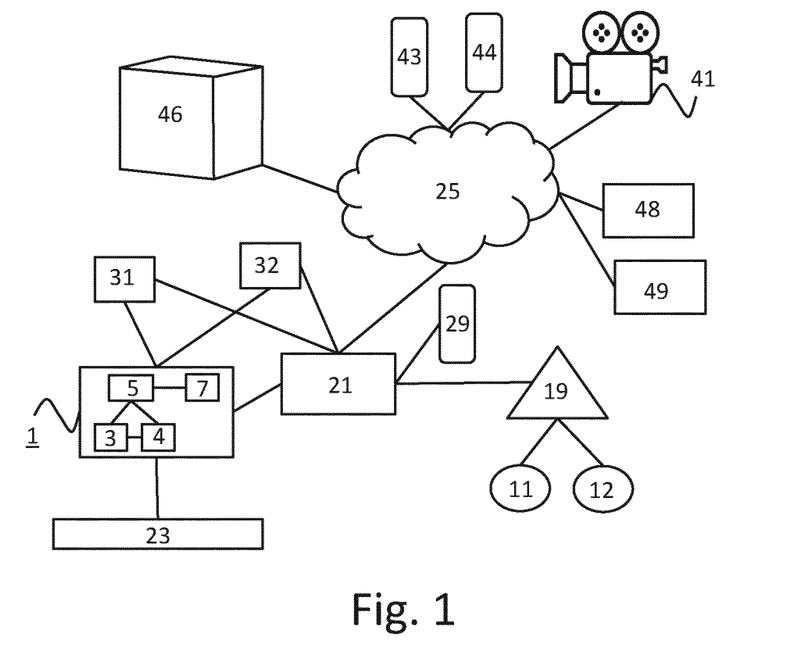
FIG. 1 is a block diagram of a first embodiment of the system.

FIG. 1 shows a first embodiment of the system for controlling a lighting device to render adjusted light effects in relation to audio and/or video content while a media rendering device renders the audio and/or video content. In the first embodiment, the system is a light controller 1. The light controller 1 may be an HDMI module like the Hue Play HDMI Sync Box, for example. In the example of FIG. 1, the audio and/or video content is rendered on an audio and/or video rendering device 23. The audio and/or video rendering device 23 may be a TV, a projector, another kind of display device, or a speaker, for example.

In the example of FIG. 1, The light controller 1 can control the lighting devices 11 and 12 via a bridge 19. The bridge 19 may be a Hue bridge, for example. The bridge 19 communicates with the lighting devices 11 and 12, e.g. using Zigbee technology. The light controller 1 is connected to a network device 21, e.g. via Wi-Fi or Ethernet. The bridge 19 is also connected to network device 21, e.g. via Wi-Fi or Ethernet. The network device 21 is connected to the Internet 25. The network device 21 may be a modem or a wireless LAN access point, for example.

Alternatively, or additionally, the light controller 1 may be able to communicate directly with the bridge 19, e.g., using Zigbee technology, and/or may be able to communicate with the bridge 19 via the Internet/cloud. Alternatively, or additionally, the light controller 1 may be able to control the lighting devices 11 and 12 without a bridge, e.g. directly via Wi-Fi, Bluetooth or Zigbee or via the Internet/cloud.

The light controller 1 is connected to the audio and/or video rendering device 23 and local media receivers 31 and 32 via HDMI or via another type of connection. The local media receivers 31 and 32 may comprise one or more streaming devices, e.g. an Apple TV, a game console, a cable TV receiver and/or a satellite TV receiver. At least one of the local media receivers 31 and 32 is able to stream audio and/or video content from a live broadcast captured by a capture device 41. The capture device 41 may also be able to capture other sensor data (e.g. weather information).

The light controller 1 comprises a receiver 3, a transmitter 4, a processor 5, and memory 7. The processor 5 is configured to receive one or more input signals, e.g. from local media receiver 31 or 32, via the receiver 3 and determine light effects based on the one or more input signals. In the embodiment of FIG. 1, the one or more input signals comprise audio and/or video content, e.g. from capture device 41, and the processor 5 is configured to perform audio and/or video analysis on the audio and/or video content to determine the light effects.

The processor 5 is further configured to identify one or more settings which have not been adjusted by a user of the light controller 1 in relation to the audio and/or video content and determine one or more values for the one or more settings based on the one or more input signals The one or more values are based on adjustments made by one or more users of one or more other systems to the one or more settings in relation to the audio and/or video content. The one or more values may be stored in memory 7.

The one or more settings may define a color palette, a minimum light intensity, a maximum light intensity, a level of dynamicity, a preferred person and/or team, and/or a delay value, for example. For instance, after the live broadcast has started, the user of the light controller 1 decreases the value of the maximum light intensity using his mobile device 29 but leaves the values of the other settings unchanged. When (enough) other users, e.g. of light controllers (e.g. HDMI modules) 48 and 49, change the color palette, the color palette is changed on the light controller 1 as well.

In the example of FIG. 1, the adjustments made by other users are stored on, and received from, an Internet server 46. For settings whose values have neither been changed by the user nor have been received from the Internet server 46 with respect to the audio and/or video being received from the capture device 41, values are used that are not specific for the audio and/or video being received from the capture device 41, e.g. default system setting values or general user-defined setting values.

The processor 5 is further configured to adjust the light effects based on the one or more values determined for the one or more settings, e.g. for the color palette, and control, via the transmitter 4, lighting device 11 and/or 12 to render the adjusted light effects. The light controller 1 may acts as a mixer, intensifying or dimming effects and in some cases playing big immersive effects instead of the original light effects derived from the audio and/or video content. In case light placement information is available, light effects can be mapped to the matching direction and location in the user's room, for example to mimic the lights at a music performance stage.

The processor 5 may be configured to render special light effects associated with events in the live broadcast. For example, users of mobile devices 43 and 44 may be present at the live event being broadcast, e.g. a concert or a sports match, and mobile devices 43 and 44 may be used to create metadata that describes an event. Alternatively or additionally, other sensors/event generators may be used to create metadata that describes an event. As a first example, people often watch a big sports match in multiple public spaces in cities. Decibel meters and/or microphones could be placed in these public spaces to determine intensity of applause or an "ooh" from the audience. As a second example, a sentiment analysis may be performed of messages on social media or local sound/video captures.

Examples of events are applause, cheering, an audience being completely silent, an announcement, and a change in game score. When an event occurs, the users of mobile devices 43 and 44 may press a (virtual) button corresponding to the occurring event or the mobile devices may detect the occurring event automatically based on input from a sensor (e.g. a camera or microphone).

Mobile devices 43 and 44 then transmit the created metadata to the Internet server 46, which distributes information relating to the detected events to the remote viewers. As a result, the input signals received by the light controller 1 comprise identifiers of events captured by the audio and/or video content. By configuring the processor 5 to adjust a subset of the light effects based on a value associated with a received identifier in response to receiving the identifier, the light controller 1 is able to render these special light effects, e.g. dim the lights when the audience is completely silent if the users of light controllers 48 and 49 have associated this special light effect with this event.

For example, the intensity of the currently playing light effects may be increased in brightness and color when the audience is applauding, a flashing light effect may be played when an announcement is ready to be made, the lights may dim when the audience is completely silent, or lights may flash like fireworks when a sports team scores.

Although it is possible to use adjustments made by any user watching the live broadcast, it is sometimes beneficial to use only adjustments made by a certain group of users. To make this possible, the processor 5 may be configured to transmit, via the transmitter 4, data to the Internet server 46 which comprises an identification of a user group or user information which allows the Internet server 46 to identify a user group. The user group comprises users with similar characteristics. The user information may comprise age, geographical location, light setup, and/or expected network delay, for example.

The processor 5 may then further be configured to determine the one or more values for the one or more settings by extracting, from an input signal received from the Internet server 46, one or more values which are based on adjustments made by the users in the user group. As a first example, when one or more users with a certain network operator in a certain geographical region set a delay value for compensating a delay, the same delay value may be used for other users under similar conditions.

As a second example, when a soccer match is played between team Blue and team Red, the colors and light intensity set by one or more users when the live event is streamed may also be used for other users in a similar geographical location. Furthermore, when team Blue scores, the lights should preferably not flash with a positive effect like fireworks when team Red scores and different special effects may therefore be rendered for users in different geographical locations.

As a third example, one or more users over 40 may have set the dynamicity level such that a calmer lighting experience is obtained. Therefore, if another user is 40+, his system may also use less dynamic light effects with longer fades. As a fourth example, if one or more users have set a delay value that depends on their network's downstream and upstream characteristics, this delay value may be used for other users in homes with similar network characteristics along with a user-set default delay value for the lighting systems of these other users, in order to compensate delays between the rendering of the audio and/or video content and the rendering of the corresponding light effect(s).

In the embodiment of the light controller 1 shown in FIG. 1, the light controller 1 comprises one processor 5. In an alternative embodiment, the light controller 1 comprises multiple processors. The processor 5 of the light controller 1 may be a general-purpose processor, e.g. ARM-based, or an application-specific processor. The processor 5 of the light controller 1 may run a Unix-based operating system for example. The memory 7 may comprise one or more memory units. The memory 7 may comprise solid-state memory, for example.

The receiver 3 and the transmitter 4 may use one or more wired or wireless communication technologies such as Zigbee to communicate with the bridge 19 and HDMI to communicate with the audio and/or video rendering device 23 and with local media receivers 31 and 32, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The light controller 1 may comprise other components typical for a light controller such as a power connector. The invention may be implemented using a computer program running on one or more processors.

The system of the invention may be an HDMI module, a mobile device, a laptop, a personal computer, a bridge, a media rendering device, a streaming device, an Internet server, or another type of device. In the embodiment of FIG. 1, the system of the invention comprises a single device. In an alternative embodiment, the system comprises multiple devices. For example, the system may comprise a cloud device and a local device, e.g. an HDMI module, and the cloud device may partially finetune light effects to a specific user profile and then later, the local device may perform final finetuning (e.g. brightness and/or which lights are used).

Figure 2:
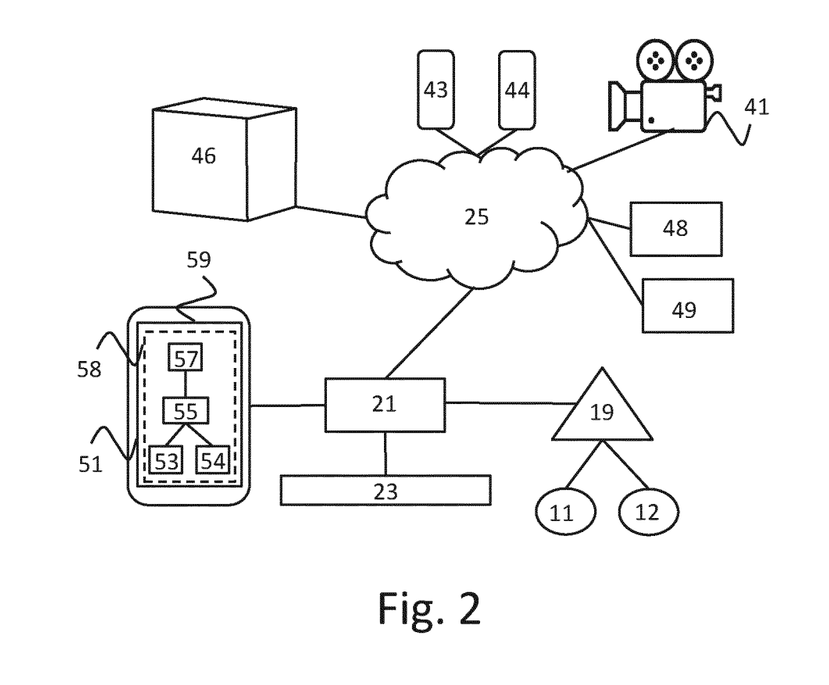
FIG. 2 is a block diagram of a second embodiment of the system.

FIG. 2 shows a second embodiment of the system for controlling a lighting device to render adjusted light effects in relation to audio and/or video content while a media rendering device renders the audio and/or video content. In the second embodiment, the system is a mobile device 51. The mobile device 51 may be a smart phone or a tablet, for example. The lighting devices 11 and 12 can be controlled by the mobile device 51 via the bridge 19. The mobile device 51 is connected to the network device 21, e.g. via Wi-Fi. Alternatively or additionally, the mobile device 51 may be connected to the Internet 25 via a base station of a mobile communication network.

In the example of FIG. 2, the audio and/or video rendering device 23 receives the audio and/or video content from the capture device 41 via the network device 21. Alternatively, the audio and/or video rendering device 23 may be connected to a local media receiver, e.g. via HDMI, an receive the audio and/or video content from the local media receiver.

The mobile device 51 comprises a receiver 53 a transmitter 54, a processor 55, a memory 57, and a display 59. The video content is preferably displayed on the audio and/or video rendering device 23 but could also be displayed on display 59 of the mobile device 51. The audio content may be played by the audio and/or video rendering device 23, by the mobile device 51, or by a speaker system or headphone connected to the mobile device 51, for example. The processor 55 is configured to receive one or more input signals via the receiver 53 and determine light effects based on the one or more input signals.

In the embodiment of FIG. 2, the one or more input signals specify the light effects and the processor 55 is configured to extract the light effects from the one or more input signals. The light effects may be automatically determined by the Internet server 46, or by another system, by performing audio and/or video analysis on the audio and/or video content from the capture device 41, for example.

The processor 55 is further configured to identify one or more settings which have not been adjusted by a user of the mobile device 51 in relation to the audio and/or video content and determine one or more values for the one or more settings based on the one or more input signals. The one or more values are based on adjustments made by one or more users of one or more other systems to the one or more settings in relation to the audio and/or video content. The processor 55 is further configured to adjust the light effects based on the one or more values determined for the one or more settings and control, via the transmitter 54, lighting device 11 and/or 12 to render the adjusted light effects.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g. from ARM or Qualcomm or an application-specific processor. The processor 55 of the mobile device 51 may run an Android or iOS operating system for example. The display 59 may be a touchscreen display, for example. The display 59 may comprise an LCD or OLED display panel, for example. The memory 57 may comprise one or more memory units. The memory 57 may comprise solid state memory, for example.

The receiver 53 and the transmitter 54 may use one or more communication technologies such as Ethernet and/or Wi-Fi (IEEE 802.11) to communicate with the network device 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 1, the light controller 1 determines lights effects by performing audio and/or video analysis on received audio and/or video content. In the embodiment of FIG. 2, the mobile device 51 extracts light effects from the received input signals. However, the mobile device 51 may additionally or alternatively be able to determine lights effects by performing audio and/or video analysis on received audio and/or video content and the light controller 1 may additionally or alternatively be able to extract light effects from the received input signals.

Figure 3:
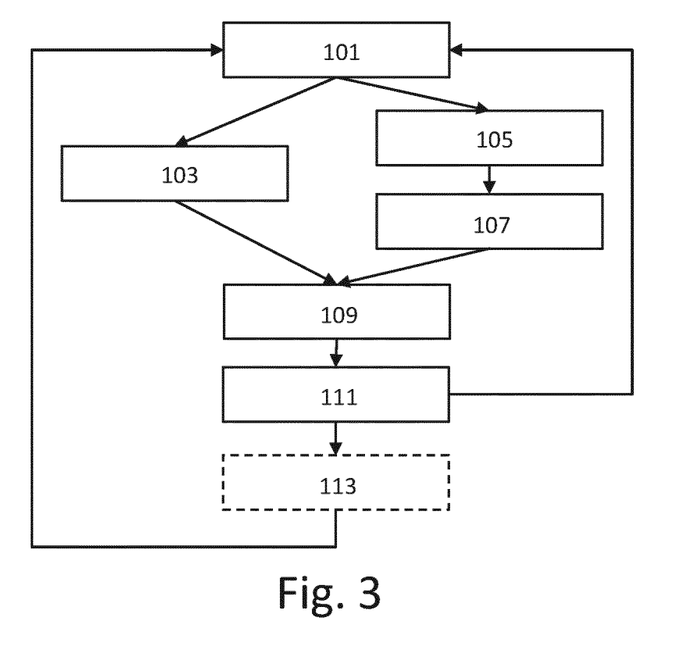
FIG. 3 is a flow diagram of a first embodiment of the method.

A first embodiment of the method of controlling a lighting device to render adjusted light effects in relation to audio and/or video content while a media rendering device renders the audio and/or video content is shown in FIG. 3. A step 101 comprises receiving one or more input signals. The one or more input signals may comprise an identifier of an event captured by the audio and/or video content. Examples of events are applause, cheering, an audience being completely silent, an announcement, and a change in game score.

Step 103 and/or step 105 are performed after step 101, dependent on the content of the one or more input signals received in step 101. Step 103 comprises determining light effects based on the one or more input signals received in step 101. Step 105 comprises identifying one or more settings which have not been adjusted by a user of the system in relation to the audio and/or video content. These one or more settings may define a color palette, a minimum light intensity, a maximum light intensity, a level of dynamicity, and/or a preferred person and/or team for example.

A step 107 is performed after step 105. Step 107 comprises determining one or more values for the one or more settings based on the one or more input signals received in step 101. The one or more values are based on adjustments made by one or more users of one or more other systems to the one or more settings in relation to the audio and/or video content.

A step 109 comprises adjusting the light effects based on the one or more values determined for the one or more settings. If the one or more input signals received in step 101 comprise an identifier of an event captured by the audio and/or video content, step 109 comprises adjusting a subset of the light effects based on at least one of the one or more values in response to receiving the identifier. This at least one value is associated with the identifier. If there are settings which have been adjusted by a user of the system in relation to the audio and/or video content, the light effects are further adjusted based on these settings in step 109.

A step 111 comprises controlling the lighting device to render the adjusted light effects as determined in step 109. Optionally, a step 113 is performed after step 111. Step 113 comprises allowing the user of the system to specify one or more own values for the one or more settings. In the next iteration of step 109, the light effects area adjusted based on the one or more own values specified for the one or more settings in step 113. After step 113 has been performed, or after step 111 has been performed if step 113 is not performed, step 101 is repeated, and the method proceeds as shown in FIG. 3.

Figure 4:
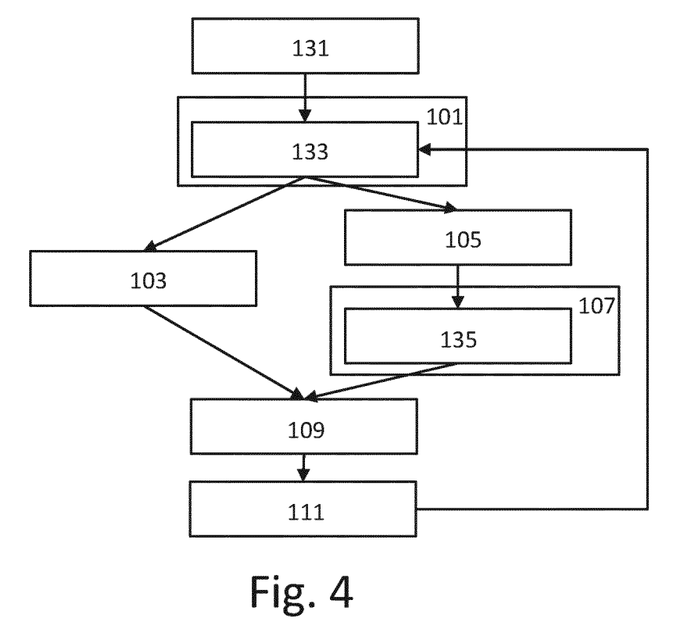
FIG. 4 is a flow diagram of a second embodiment of the method.

A second embodiment of the method of controlling a lighting device to render adjusted light effects in relation to audio and/or video content while a media rendering device renders the audio and/or video content is shown in FIG. 4. In the embodiment of FIG. 4, compared to the embodiment of FIG. 3, a step 131 is performed before step 101, step 101 is implemented by a step 133, step 107 comprise a sub step 135 and step 113 has been omitted.

Step 131 comprises transmitting data to a further system. The data comprises an identification of a user group or user information which allows the further system to identify a user group. The user group comprises users with similar characteristics. The user information may comprise age, geographical location, light setup, and/or expected network delay, for example.

Step 133 is performed after step 131. At least one of the one or more input signals received in step 133 is received from the further system and comprises one or more values which are based on adjustments made by the users in the user group to the one or more settings in relation to the audio and/or video content. Step 135 comprises extracting these values from the at least one input signal. Step 109 comprises adjusting the light effects based on at least the values extracted in step 135.

Figure 5:
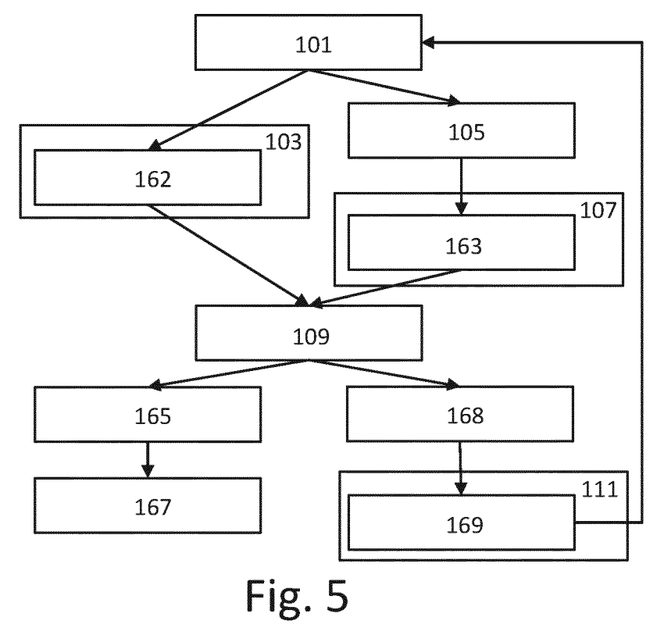
FIG. 5 is a flow diagram of a third embodiment of the method.

A third embodiment of the method of controlling a lighting device to render adjusted light effects in relation to audio and/or video content while a media rendering device renders the audio and/or video content is shown in FIG. 5.

Step 101 comprises receiving one or more input signals. Step 103 and/or step 105 are performed after step 101, dependent on the content of the one or more input signals received in step 101. Step 103 comprises determining light effects based on the one or more input signals received in step 101. In the embodiment of FIG. 5, step 103 is implemented by a step 162. Step 162 comprises performing audio and/or video analysis on audio and/or video content comprised in the one or more input signals received in step 101 to determine the light effects.

Step 105 comprises identifying one or more settings which have not been adjusted by a user of the system in relation to the audio and/or video content. Step 107 is performed after step 105. Step 107 comprises determining one or more values for the one or more settings based on the one or more input signals received in step 101. The one or more values are based on adjustments made by one or more users of one or more other systems to the one or more settings in relation to the audio and/or video content. In the embodiment of FIG. 5, step 107 is implemented by a step 163. Step 163 comprises determining at least a delay value based on at least one of the one or more values. This delay value may further be based on a user-specified default delay value.

Step 109 comprises adjusting the light effects determined in step 162 based on the one or more values determined for the one or more settings in step 163. Steps 165 and 167 and steps 168 and 111 are performed after step 109. Step 167 comprises outputting an audio and/or video signal which comprises audio and/or video content received in step 101 to a media rendering device. Step 165, performed before step 167, comprises delaying the outputting of the audio and/or video signal compared to the outputting of the light commands with the delay value if needed.

Step 111 comprises controlling the lighting device to render the adjusted light effects as determined in step 109. In the embodiment of FIG. 5, step 111 is implemented by a step 169. Step 169 comprises outputting light commands specifying the adjusted light effects. Step 168, performed before step 169, comprises delaying the outputting of the light commands compared to the outputting of the audio and/or video signal with the delay value if needed. After steps 167 and 169 have been performed, step 101 is repeated, and the method proceeds as shown in FIG. 5.

Figure 6:
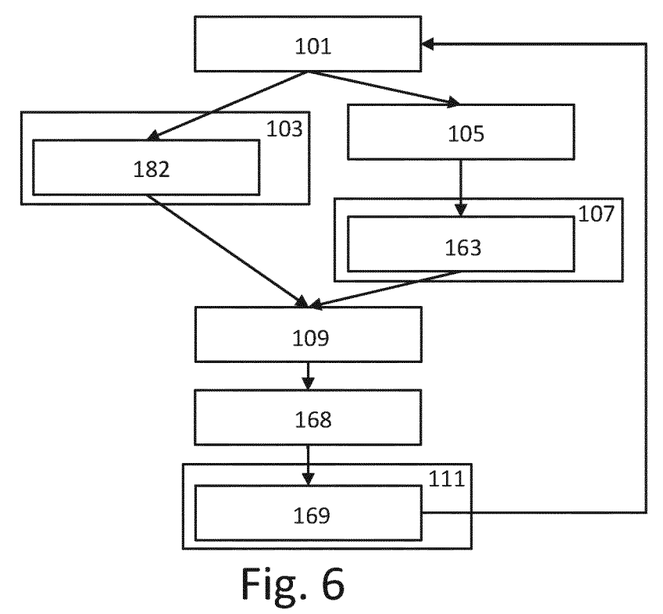
FIG. 6 is a flow diagram of a fourth embodiment of the method.

A fourth embodiment of the method of controlling a lighting device to render adjusted light effects in relation to audio and/or video content while a media rendering device renders the audio and/or video content is shown in FIG. 6.

Step 101 comprises receiving one or more input signals. Step 103 and/or step 105 are performed after step 101, dependent on the content of the one or more input signals received in step 101. Step 103 comprises determining light effects based on the one or more input signals received in step 101. In the embodiment of FIG. 6, step 103 is implemented by a step 182. Step 182 comprises extracting light effects specified in the one or more input signals received in step 101 from these one or more input signals.

Step 105 comprises identifying one or more settings which have not been adjusted by a user of the system in relation to the audio and/or video content. Step 107 is performed after step 105. Step 107 comprises determining one or more values for the one or more settings based on the one or more input signals received in step 101. The one or more values are based on adjustments made by one or more users of one or more other systems to the one or more settings in relation to the audio and/or video content. In the embodiment of FIG. 6, step 107 is implemented by step 163. Step 163 comprises determining at least a delay value based on at least one of the one or more values. This delay value may further be based on a user-specified default delay value.

Step 109 comprises adjusting the light effects determined in step 182 based on the one or more values determined for the one or more settings in step 163. Step 168 is performed after step 109. Step 168 comprises delaying the outputting of the light commands compared to the outputting of the audio and/or video signal with the delay value determined in step 163, if needed.

Next, step 111 comprises controlling the lighting device to render the adjusted light effects as determined in step 109. In the embodiment of FIG. 6, step 111 is implemented by step 169. Step 169 comprises outputting light commands specifying the adjusted light effects. After step 169 has been performed, step 101 is repeated, and the method proceeds as shown in FIG. 6.

The embodiments of FIGS. 3 to 6 differ from each other in multiple aspects, i.e. multiple steps have been added or replaced. In variations on these embodiments, only a subset of these steps is added or replaced and/or one or more steps is omitted. As a first example, step 113 of FIG. 3 may be added to one or more of the embodiments of FIGS. 4 to 6. As a second example, steps 131, 133, and 135 of FIG. 4 may be added to one or more of the embodiments of FIGS. 3, 5 and 6.

Figure 7:
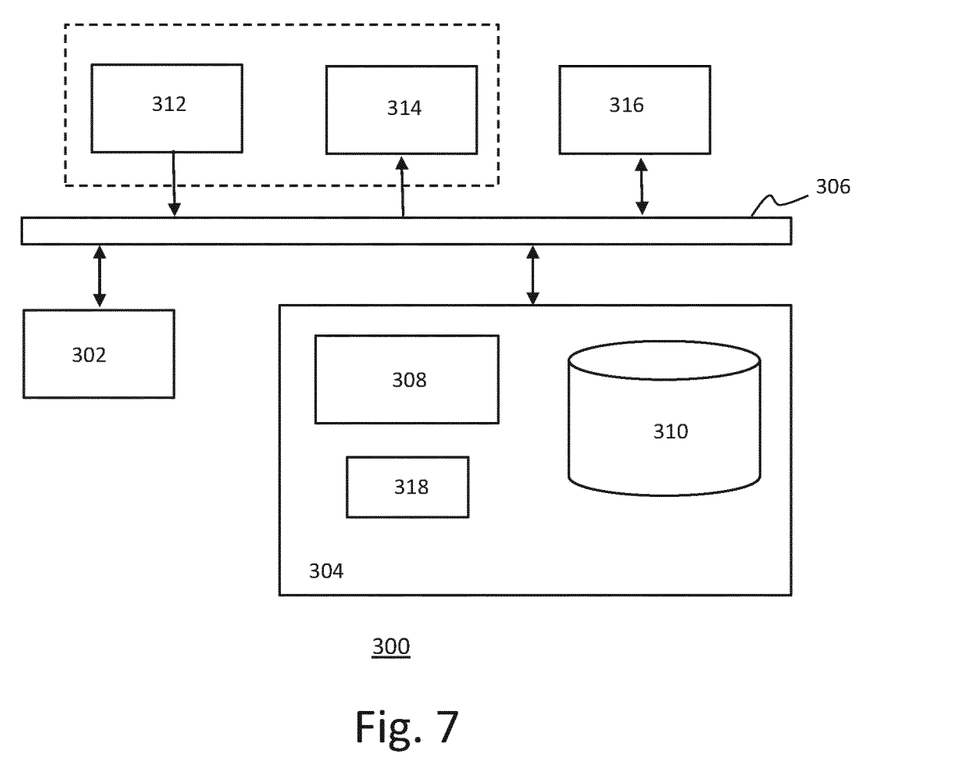
FIG. 7 is a block diagram of an exemplary data processing system for performing the method of the invention.

FIG. 7 depicts a block diagram illustrating an exemplary data processing system that may perform the method as described with reference to FIGS. 3 to 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting device to render adjusted light effects in relation to audio and/or video content while a media rendering device renders said audio and/or video content, said system comprising:
    at least one input interface;
    at least one output interface; and
    at least one processor configured to:
        receive one or more input signals, comprising said audio and/or video content, via said at least one input interface,
        perform audio and/or video analysis on said audio and/or video content,
        determine light effects based on said analysis of said audio and/or video content,
        affirmatively identify one or more settings that have not been adjusted by a user of said system in relation to said audio and/or video content,
        transmit, via said at least one output interface, data comprising an identification of a user group or user information to a further system, said data allowing said further system to identify a further user group comprising users with similar characteristics as said user of said system based at least in part on said one or more settings that were not adjusted by said user of said system,
        receive, from said further system via said at least one input interface, one or more input signals indicative of adjustments made by one or more users in said further user group of one or more other systems to said one or more settings in relation to said audio and/or video content based at least in part on said one or more settings that were not adjusted by said user of said system,
        extract, from at least one of said one or more input signals, one or more values that are based on adjustments made by said users in said further user group,
        determine one or more values for said one or more settings based on said adjustments,
        adjust said light effects based on said one or more values determined for said one or more settings, and
        control, via said at least one output interface, said lighting device to render said adjusted light effects.

2. The system as claimed in claim 1, wherein said one or more input signals comprise an identifier of an event, said event captured in said audio and/or video content and said at least one processor is configured to adjust a subset of said light effects based on at least one of said one or more values in response to receiving said identifier, said at least one value being associated with said identifier.

3. The system as claimed in claim 2, wherein said event is one of applause, cheering, an audience being completely silent, an announcement, or a change in game score.

4. The system as claimed in claim 1, wherein said at least one processor is configured to:
output, via said at least one output interface, an audio and/or video signal comprising said audio and/or video content to a media rendering device,
control said lighting device by outputting light commands specifying said adjusted light effects,
determine a delay value based on at least one of said one or more values, and
delay said outputting of said audio and/or video signal compared to said outputting of said light commands or said outputting of said light commands compared to said outputting of said audio and/or video signal with said delay value.

5. The system as claimed in claim 1, wherein said one or more one input signals specify said light effects.

6. The system as claimed in claim 5, wherein said at least one processor is configured to:
control said lighting device by outputting light commands specifying said adjusted light effects,
determine a delay value based on at least one of said one or more values, and
delay said outputting of said light commands with said delay value.

7. The system as claimed in claim 4, wherein said at least one processor is configured to determine said delay value further based on a user-specified default delay value.

8. The system as claimed in claim 1, wherein said one or more settings define at least one of: a color palette, a minimum light intensity, a maximum light intensity and a preferred person and/or team.

9. The system as claimed in claim 1, wherein said at least one processor is configured to allow said user of said system to specify one or more own values for said one or more settings and adjust said light effects based on said one or more own values specified for said one or more settings.

10. The system as claimed in claim 1, wherein said user information comprises age, geographical location, light setup, and/or expected network delay.

11. The system as claimed in claim 1, wherein said system further comprises said further system.

12. The system as claimed in claim 1, wherein extracting said one or more values further includes adjustments based on said one or more settings that were not adjusted by said user of said system.

13. A method of operating a system for controlling a lighting device to render adjusted light effects in relation to audio and/or video content while a media rendering device renders said audio and/or video content, said method comprising:
receiving one or more input signals comprising said audio and/or video content;
performing audio and/or video analysis on said audio and/or video content;
determining light effects based on said analysis of said audio and/or video content;
affirmatively identifying one or more settings which have not been adjusted by a user of said system in relation to said audio and/or video content;
transmitting data comprising an identification of a user group or user information to a further system, said data allowing said further system to identify a further user group comprising users with similar characteristics as said user of said system based at least in part on said one or more settings that were not adjusted by said user of said system,
receiving from said further system one or more input signals indicative of adjustments made by one or more users in the user group of one or more other systems to said one or more settings in relation to said audio and/or video content,
extracting, from at least one of said one or more input signals, one or more values which are based on adjustments made by said users in said further user group,
determining one or more values for said one or more settings based on said adjustments;
adjusting said light effects based on said one or more values determined for said one or more settings; and
controlling said lighting device to render said adjusted light effects.

14. A non-transitory computer-readable medium on which are stored a plurality of non-transitory computer-readable instructions that when executed on a processor are configured to perform the steps comprising the method of claim 12.

* * * * *